United States Patent
Yun et al.

(10) Patent No.: US 8,953,431 B2
(45) Date of Patent: Feb. 10, 2015

(54) APPARATUS AND METHOD FOR ESTIMATING CHANNEL IN DIGITAL VIDEO BROADCASTING SYSTEM

(75) Inventors: Sung-Ryul Yun, Suwon-si (KR); Hong-Sil Jeong, Seoul (KR); Alain Mourad, Middlesex (GB); Ismael Gutierrez, Richmond (GB)

(73) Assignee: Samsung Electronics Co., Ltd (KR)

( * ) Notice: Subject to any disclaimer, the term of this patent is extended or adjusted under 35 U.S.C. 154(b) by 415 days.

(21) Appl. No.: 13/291,607

(22) Filed: Nov. 8, 2011

(65) Prior Publication Data

US 2012/0134440 A1 May 31, 2012

(30) Foreign Application Priority Data

Nov. 29, 2010 (KR) .................. 10-2010-0119647

(51) Int. Cl.
*H04L 27/26* (2006.01)
*H04L 5/00* (2006.01)
*H04W 72/04* (2009.01)

(52) U.S. Cl.
CPC .......... *H04L 27/2626* (2013.01); *H04L 5/0048* (2013.01); *H04L 27/2613* (2013.01)
USPC ............ 370/210; 370/252; 370/430; 370/478

(58) Field of Classification Search
CPC .. H04L 27/2602; H04B 7/2656; H04W 72/04
USPC .................. 370/210, 252, 430, 478
See application file for complete search history.

(56) References Cited

U.S. PATENT DOCUMENTS

| | | | |
|---|---|---|---|
| 2009/0190677 A1* | 7/2009 | Jokela et al. .................. | 375/260 |
| 2011/0158196 A1* | 6/2011 | Power et al. .................. | 370/329 |
| 2012/0170506 A1* | 7/2012 | Chun et al. .................... | 370/315 |
| 2013/0219431 A1* | 8/2013 | Hong et al. ..................... | 725/54 |
| 2014/0177554 A1* | 6/2014 | Kwak et al. ................... | 370/329 |

* cited by examiner

*Primary Examiner* — John Pezzlo

(74) *Attorney, Agent, or Firm* — The Farrell Law Firm, P.C.

(57) ABSTRACT

A method of operation of a transmitting node in an Orthogonal Frequency Division Multiplexing (OFDM) communication system is provided. The method includes generating a frame including a plurality of physical layer zones, each of the plurality of physical layer zones applying different Fast Fourier Transform (FFT) sizes and different pilot patterns; and transmitting the frame.

32 Claims, 7 Drawing Sheets

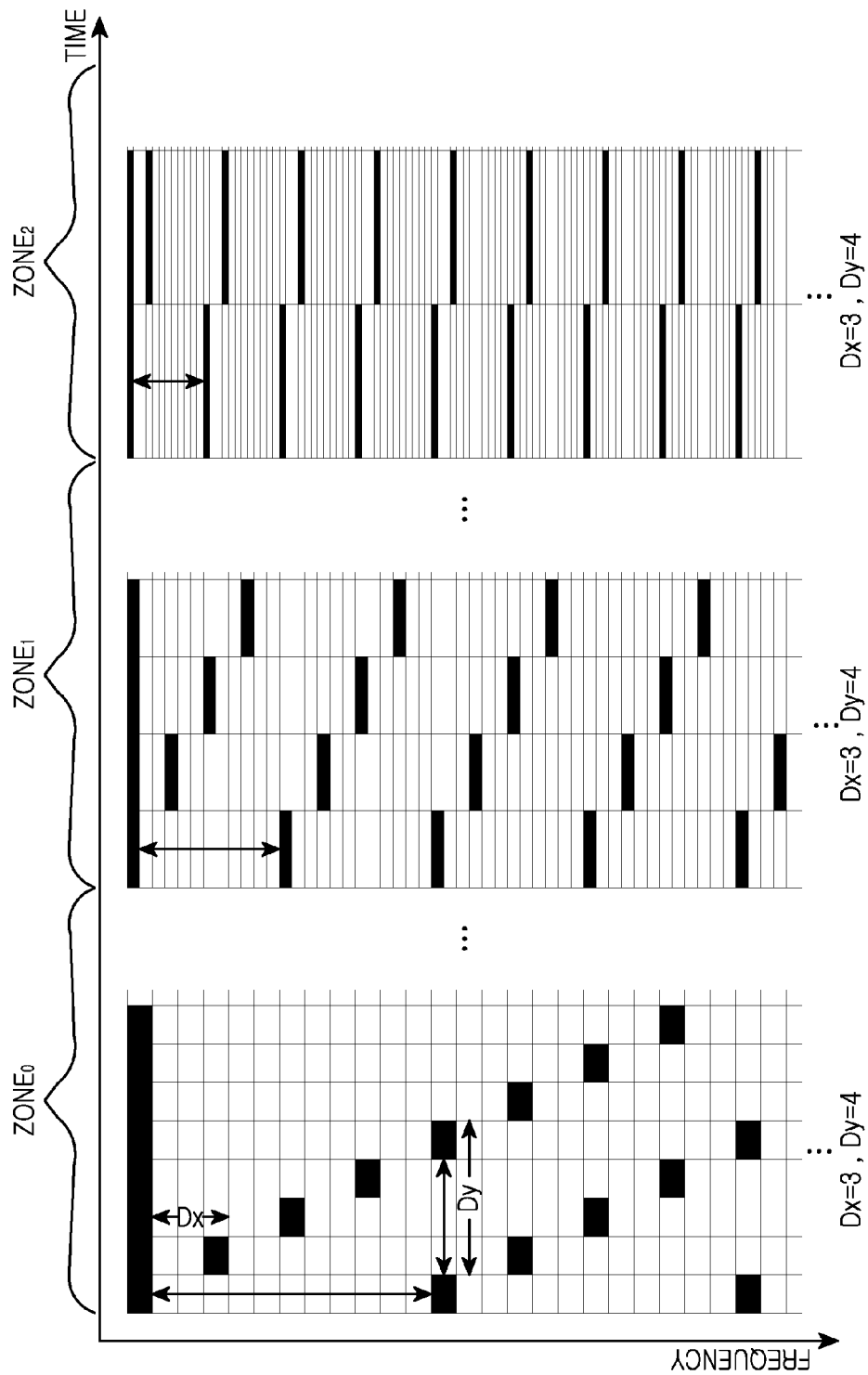

ically used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

APPARATUS AND METHOD FOR ESTIMATING CHANNEL IN DIGITAL VIDEO BROADCASTING SYSTEM

PRIORITY

The present application claims priority under 35 U.S.C. §119(a) to a Korean patent application filed in the Korean Intellectual Property Office on Nov. 29, 2010 and assigned Serial No. 10-2010-0119647, the entire disclosure of which is incorporated herein by reference.

BACKGROUND OF THE INVENTION

1. Field of the Invention

The present invention relates generally to a digital video broadcasting system and, more particularly, to an apparatus and method for estimating a channel in the digital video broadcasting system.

2. Description of the Related Art

A digital broadcasting system is a broadcasting system using digital transmission technology. For example, a digital broadcasting system includes Digital Audio Broadcasting (DAB), Digital Video Broadcasting (DVB), Digital Multimedia Broadcasting (DMB, and the like. A DVB system for providing a DVB service is a European digital broadcasting technology for supporting existing digital broadcasting, as well as digital multimedia services for mobile and portable terminals.

The DVB system can multiplex Moving Picture Experts Group (MPEG) 2 Transport Stream (TS) broadcasting data and transmit an Internet Protocol (IP) datastream at the same time. The DVB system can multiplex and transmit datastreams into one IP stream according to various services. Thus, users are able to receive and demultiplex the IP stream to the datastreams of the respective services. The user can demodulate the datastreams of the respective services and output the demodulated data onto a screen. In order to accomplish the above, the user needs information relating to the type of service provided from the DVB system and contents of the services.

A frame structure of a conventional DVB for a Second Generation Terrestrial (DVB-T2) system includes one system parameter in a frame interval. As long as the system parameter does not change, the DVB-T2 system is robust and efficient. However, when the DVB system is implemented in a mobile communication environment, the fixed robustness and efficiency characteristics are not suitable for a plurality of users in different communication environments (for example, a plurality of users moving at different speeds). Hence, a solution for supporting various users in different communication environments is necessary.

SUMMARY OF THE INVENTION

The present invention is designed to substantially solve at least the above-described problems and/or disadvantages and to provide at least the advantages below. Accordingly, one aspect of the present invention is to provide an apparatus and a method for supporting various users under different communication environments in a DVB system.

In accordance with an aspect of the present invention, an operating method of a transmitting node in an Orthogonal Frequency Division Multiplexing (OFDM) communication system is provided. The method includes generating a frame including a plurality of physical layer zones, each of the plurality of physical layer zones applying different Fast Fourier Transform (FFT) sizes and different pilot patterns; and transmitting the frame.

In accordance with another aspect of the present invention, an operating method of a receiving node in an OFDM communication system is provided. The method includes analyzing signaling data in a criterion physical layer zone of a plurality of physical layer zones, each of the plurality of physical layer zones applying different FFT sizes and different pilot patterns; determining a system parameter and a pilot pattern of a zone of a broadcasting service to receive; extracting pilot tones according to the pilot pattern; estimating a channel value of data tones using the pilot tones; and decoding data using the channel value.

In accordance with another aspect of the present invention, an apparatus of a transmitting node in an OFDM communication system is provided. The apparatus includes a generator for generating a frame including a plurality of physical layer zones, each of the plurality of physical layer zones applying different FFT sizes and different pilot patterns; and a transmitter for transmitting the frame.

In accordance with another aspect of the present invention, an apparatus of a receiving node in an OFDM communication system is provided. The apparatus includes a receiver for receiving a signal; and an analyzer for analyzing signaling data in a criterion physical layer zone of a plurality of physical layer zones, each of the plurality of physical layer zones applying different FFT sizes and different pilot patterns, determining a system parameter and a pilot pattern of a zone of a broadcasting service to receive, extracting pilot tones according to the pilot pattern, estimating a channel value of data tones using the pilot tones, and decoding data using the channel value.

BRIEF DESCRIPTION OF THE DRAWINGS

The above and other aspects, features and advantages of the present invention will be more apparent from the following detailed description taken in conjunction with the accompanying drawings, in which:

FIGS. 2A and 2B illustrate pilot patterns of the DVB system, according to embodiments of the present invention;

Throughout the drawings, like reference numerals will be understood to refer to like parts, components and structures.

DETAILED DESCRIPTION OF EMBODIMENTS OF THE PRESENT INVENTION

Figure 1:
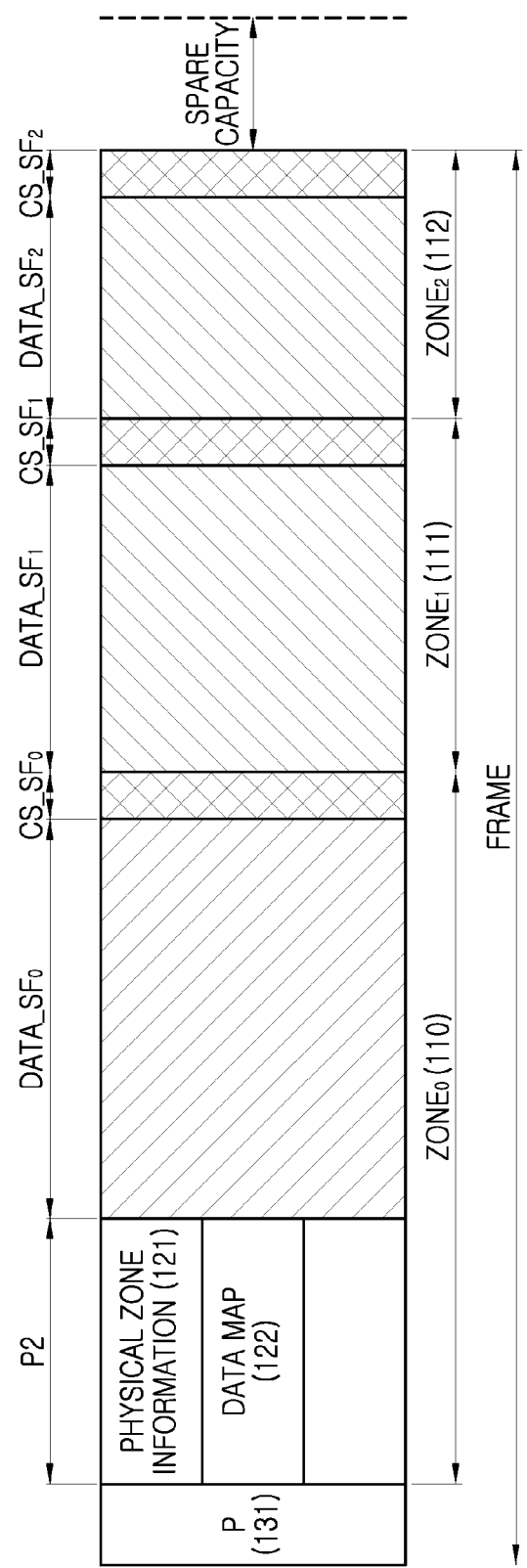
FIG. 1 illustrates a frame structure of a Digital Video Broadcasting (DVB) system, according to an embodiment of the present invention.

Hereinafter, embodiments of the present invention will be described with reference to the accompanying drawings. Throughout the drawings, the same elements will be designated by the same reference numerals.

The terms and words used in the following description and claims are not limited to the dictionary meanings, but merely used to enable a clear and consistent understanding of the invention. Accordingly, it should be apparent to those skilled in the art that the following description of embodiments of the present invention is provided for illustrative purposes only and not for the purpose of limiting the invention as defined by the appended claims and their equivalents.

It is to be understood that the singular forms "a," "an," and "the" may refer to the singular as well as the plural. Thus, for example, reference to "a component surface" may refer to one or more of such surfaces.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present invention provide a technique for supporting various users under different communication environments in a DVB system. Hereinafter, the DVB system is described. However, the present invention is equally applicable to communication systems for some other purposes than the DVB. For example, the present invention can be equally applied to Orthogonal Frequency Division Multiplexing (OFDM) communication systems.

FIG. 1 illustrates a frame structure of a DVB system according to an embodiment of the present invention.

Referring to FIG. 1, the frame includes a plurality of physical layer zones; that is, a $zone_0$ 110, a $zone_1$ 111, a $zone_2$ 112, and a preamble 131.

The $zone_0$ 110, the $zone_1$ 111, and the $zone_2$ 112 are regions for carrying broadcasting data or information used for receiving the broadcasting data. The zones 110, 111, and 112 each include Data_Physical Zone (DATA_PZ) and a Closing Symbol (CS)_PZ. The DATA_PZ carries broadcasting service data, and the CS_PZ includes a plurality of pilot symbols for the channel estimation as the last OFDM symbol of the corresponding zone. The broadcasting system can provide a plurality of broadcasting services, and the broadcasting service is provided over at least one of the zones 110, 111, and 112. That is, the zones 110, 111, and 112 can provide different broadcasting services. The broadcasting service is classified to a Physical Layer Pipe (PLP) in the corresponding zone. Specifically, different physical layer system parameters are applied to the zones. Using the zones 110, 111, and 112, the broadcasting system can optimize the physical layer system parameter according various environments, for example, according to communication characteristics such that of a stationary recipient, a walking recipient, or a quickly moving recipient. More specifically, the system can include the $zone_0$ 110 for the quickly moving users, the $zone_1$ 111 for the walking users, and the $zone_2$ 112 for the stationary users. As such, the broadcasting system can consider both of efficiency and robustness. To accomplish the above, different Fast Fourier Transform (FFT) sizes are applied to the zones 110, 111 and 112, and, accordingly, a frequency spacing and a time interval between the pilot symbols vary per zone. The frequency spacing between the pilot symbols indicates the interval between two pilot symbols in the frequency axis and can be represented in units of hertz (Hz), kilohertz (kHz), or megahertz (MHz). The time interval between the pilot symbols indicates the interval between the pilot symbols in the same frequency and can be represented as the unit of seconds (s), milliseconds (ms), or microseconds (μs).

The preamble 131 is positioned at the head of the frame in the time axis and used to synchronize the transmitting node with the receiving node. The preamble 131 includes information relating to the FFT size and a guard interval of the $zone_0$ 110.

A P2 region following the preamble 131 in the $zone_0$ 110 contains signaling data. The signaling data includes physical zone information 121 and data map 122. The physical zone information 121 is system parameter information of the physical layer zones 110, 111 and 112, and includes characteristic information of the physical layer zones 110, 111 and 112, for example, information relating to the number of subcarriers, multi-antenna scheme applied, guard interval length, and Cyclic Prefix (CP) length. The data map 122 includes locations of the physical layer zones 110, 111 and 112, physical layer composition information, PLP allocation information, and datastream allocation information. Thus, the receiving node receives the intended data by decoding the zone allocated to the user using the signaling data of the P2 region.

In FIG. 1, the P2 region is placed in the first zone of the frame; that is, in the $zone_0$ 110. Thus, data of the $zone_0$ 110 can be inserted in the remaining region except the physical zone information 121 and the data map 122 in the P2 region. Alternatively, unlike FIG. 1, the P2 region and the $zone_0$ 110 can be separated. It is advantageous that the P2 region include only the physical zone information 121 and the data map 122 and the zones include only the DATA_PZ and the CS_PZ.

To support the above, the preamble 131 carries the information of the FFT size and the guard interval of the P2 region, rather than the information of the $zone_0$ 110. The receiving node obtains the information of the FFT size and the guard interval of the P2 region by receiving the preamble 131, and then obtains the physical zone information 121 and the data map 122 in the P2 region. That is, the receiving node receives the system parameters of the zones based on the physical zone information and receives the data of the intended zone.

In the frame structure, the data region of the zone includes only data symbols, or data symbols and pilot symbols. The pilot symbols are used to estimate a channel value of the resource in which the data symbol is located. The pilot symbols may be arranged in a scattered manner, be continuously arranged or be arranged to be suitable for the system, and can be of a scattered pilot structure, a continuous pilot structure, or a pilot structure suitable for the system. The pilot pattern can be the same or different for each zone.

When the pilot pattern is the same per zone, the pilot pattern is governed by the following Equation 1:

$$k \bmod(D_x, D_y) = D_x(l \bmod D_y) \quad (1)$$

In Equation (1), $D_x$ denotes an interval for shifting the pilot in the next OFDM symbol (subcarrier spacing) and can be represented as the number of the subcarriers. $D_y$ denotes the interval between the pilot symbols in the same frequency (OFDM symbol spacing) and can be represented as the number of the OFDM symbols. k denotes a subcarrier index of the OFDM symbol and l denotes an OFDM symbol index.

When the same pilot pattern is applied to all of the zones based on Equation (1), the pilot pattern is shown in FIG. 2A. FIG. 2A illustrates the pilot patterns of the DVB system according to an embodiment of the present invention. In FIG. 2A, the $zone_0$ uses 2K FFT, the $zone_1$ uses 4 Kilobyte (K) FFT, the $zone_2$ uses 8K FFT, $D_x$ is 3, and $D_y$ is 4. The shaded region in FIG. 2A indicates the pilot. Referring to FIG. 2A, the values $D_x$ and $D_y$ applied to the physical layer zones are the same. Hence, as the FFT size increases, the frequency spacing between the pilot symbols is shortened and the time interval is lengthened. For example, provided that the subcarrier spacing of the $zone_0$ using the 2K FFT of FIG. 2A is 2 kHz, the frequency spacing between the pilot symbols in the zone$_0$ is 22 kHz. Since the subcarrier spacing of the zone$_1$ using the 4K FFT is half of the zone$_0$, the frequency spacing between the pilot symbols in the zone$_1$ is 11 kHz. As the FFT size increases, the frequency spacing between the pilot symbols decreases.

When designing the pilot pattern, it must be considered whether the frequency spacing and the time interval between the pilot symbols, which are related to channel estimation performance. When generating the plurality of physical layer zones, the broadcasting system according to an embodiment of the present invention varies the efficiency and robustness by varying the FFT size per zone. As a result, the frequency spacing and the time interval between the pilot symbols in the zone differ. Table 1 shows the subcarrier spacing and the OFDM symbol length consecutively positioned based on the FFT size of the DVB-T2.

TABLE 1

| Parameter | 1k FFT | 2k FFT | 4k FFT | 8k FFT |
| --- | --- | --- | --- | --- |
| Symbol length (µs) | 112 | 224 | 448 | 896 |
| Subcarrier spacing (Hz) | 8,929 | 4,464 | 2,232 | 1,116 |

As shown in Table 1, as the FFT size increases, the subcarriers are densely distributed in the same frequency (e.g., 8 MHz) and the spacing of the successive subcarriers decreases. On the other hand, as the number of OFDM time samples increases according to the FFT size, the OFDM symbol length becomes greater. When the same pilot pattern is applied to all of the zones, the channel estimation performance varies per zone. Thus, it is advantageous to apply the different pilot patterns to the zones.

To provide the same channel estimation performance in the zones, the frequency spacing between the pilot symbols used to estimate the channel should be the same to maintain the same frequency interpolation performance of two pilot symbols in every physical layer zone. Moreover, the time interval of the pilot symbols should be the same in order to maintain the same time interpolation performance of two pilot symbols in every physical layer zone.

To satisfy the two conditions, the following rule can be applied. To equalize the frequency spacing between the pilot symbols, the rule based on the following Equation (2) can be used:

$$\frac{D_{x_i} D_{y_i}}{FFT_i} = \frac{D_{x_j} D_{y_j}}{FFT_j} \quad (2)$$

In Equation 2, $FFT_i$ and $FFT_j$ denote the FFT size of the zone$_i$ and the zone$_j$, $D_{x_i}$ and $D_{x_j}$ denote the subcarrier spacing (the number of subcarriers) of the zone$_i$ and the zone$_j$, and $D_{y_i}$ and $D_{y_j}$ denote the OFDM symbol spacing for iterating the scattered pilot in the zone$_i$ and the zone$_j$. The frequency spacing between two pilot symbols in the same OFDM symbol in the zone is equalized based on Equation (2).

To equalize the time interval between the pilot symbols, a rule based on the following Equation (3) can be used.

$$D_{y_i} FFT_i = D_{y_j} FFT_j \quad (3)$$

In Equation (3), $FFT_i$ and $FFT_j$ denote the FFT size of the zone$_i$ and the zone$_j$, and $D_{y_i}$ and $D_{y_j}$ denote the OFDM symbol spacing of the zone$_i$ and the zone$_j$. The time interval between two pilot symbols in the same subcarrier in the zone is identical based on Equation (3).

The pilot symbol pattern of each zone is determined based on the rules of Equations (2) and (3) as follows. Hereafter, it is assumed that three physical layer zones are given, the zone$_0$ uses the 2K FFT, the zone$_1$ uses the 4K FFT, and the zone$_2$ uses the 8K FFT. Initially, a system designer determines the pilot pattern suitable for the channel environment considered in the zone$_0$. The pilot patterns of the other zones are determined based on the pilot pattern of the zone$_0$. For example, the system designer determines the pilot pattern of the zone$_0$ as $D_{x0}=2$ and $D_{y0}=8$. Based on Equations 2 and 3, the pilot pattern of the zone$_1$ is $D_{x1}=8$ and $D_{y1}=4$ and the pilot pattern of the zone$_2$ is $D_{x2}=32$ and $D_{y2}=2$. In embodiments of the present invention, after the pilot pattern of the zone$_0$ is determined, the pilot patterns of the zone$_1$ and the zone$_2$ are determined. That is, the zone$_0$ provides a criterion of the pilot pattern. Irrespective of the zone of the initial pilot symbol pattern; that is, the criterion zone of the pilot pattern, the pilot patterns of the other zones can be determined based on Equations 2 and 3. The zone providing the criterion of the pilot pattern is referred to as "a criterion zone of the pilot pattern."

Table 2 shows the pilot patterns according to the rules of Equation (2) and Equation (3).

TABLE 2

| | Zone$_0$ | Zone$_1$ | Zone$_2$ |
| --- | --- | --- | --- |
| FFT size | 2K | 4K | 8K |
| $D_{xi}$ | 2 | 8 | 32 |
| $D_{yi}$ | 8 | 4 | 2 |

Figure 2B:
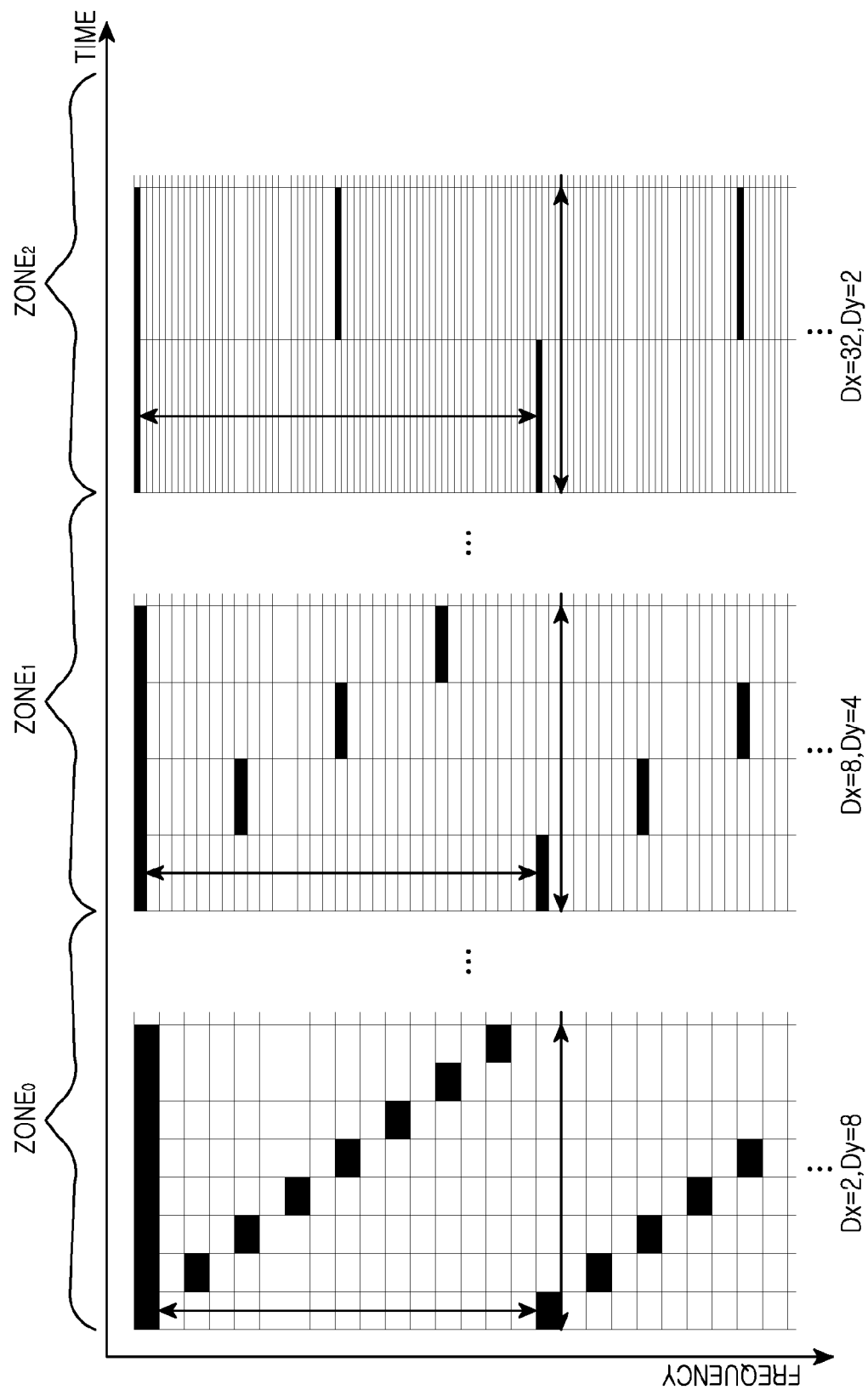

As explained above, when different pilot patterns are used to equalize the channel estimation performance of the zones, the pilot patterns are shown in FIG. 2B. FIG. 2B depicts the pilot patterns of the system according to another embodiment of the present invention. In FIG. 2B, the shaded region indicates the pilot symbols. Referring to FIG. 2B, the frequency spacing between two pilot symbols in the same OFDM symbol and the time interval between two pilot symbols in the same subcarrier of each zone are uniform. Thus, the physical layer zones can provide the same channel estimation performance.

Figure 3:
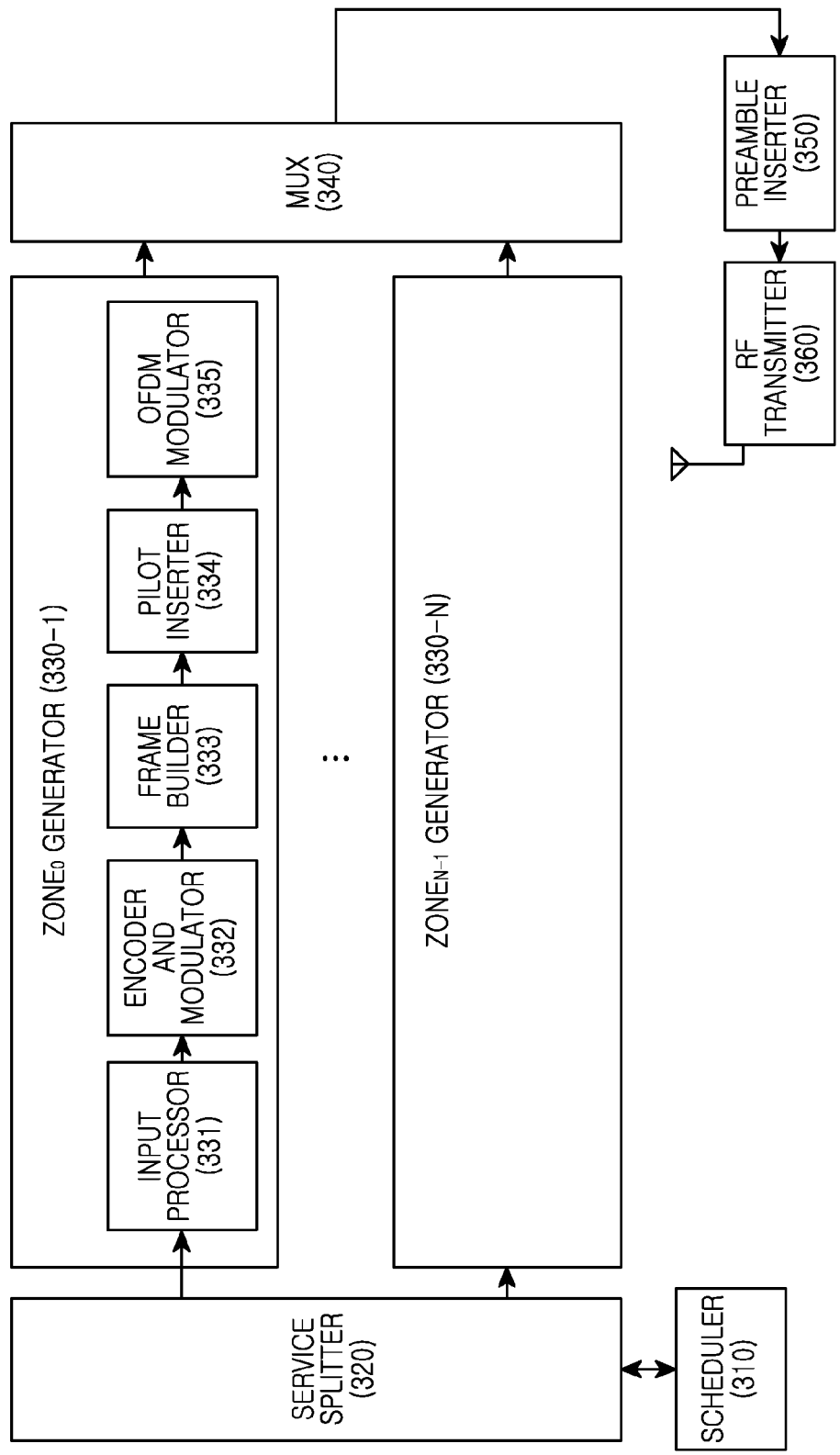
FIG. 3 illustrates a transmitting node in the DVB system, according to an embodiment of the present invention.

FIG. 3 is a block diagram of a transmitting node in the DVB system according to an embodiment of the present invention.

As shown in FIG. 3, the transmitting node includes a scheduler 310, a service splitter 320, a plurality of zone generators 330-1 through 330-N, a MUltipleXer (MUX) 340, a preamble inserter 350, and a Radio Frequency (RF) transmitter 360.

The scheduler 310 schedules the broadcasting services. Specifically, the scheduler 310 determines a zone through which the broadcasting service is provided, and allocates the resource in such determined zone. The service splitter 320 provides data of the broadcasting service to the corresponding zone generator, according to the determination of the scheduler 310. The service splitter 320 provides the signaling data to the zone$_0$ generator 330-1 which manages zone$_0$. Herein, the signaling data includes the physical zone information 121 and the data map 122. As stated in FIG. 1, the P2 region and the zone$_0$ can be separated in the frame. A P2 region generator (not shown) can be further provided in addition to the N-ary zone generators 330-1 through 330-N. The service splitter 320 provides the signaling data including the physical zone information and the data map to the P2 region generator, not the zone$_0$ generator 330-1.

The zone generators 330-1 through 330-N generate a signal to transmit over the zone and include the same subcomponents. The zone generators 330-1 through 330-N apply the different system parameters corresponding to the respective zones. Alternatively, unlike FIG. 3, the transmitting node can include a single zone generator by itself. The single zone generator generates a signal by applying the different system parameter according to the zone of the broadcasting service data to provide. That is, the transmitting node can concurrently process the zones using the single zone generator.

The zone generators 330-1 through 330-N each include an input processor 331, an encoder and modulator 332, a frame builder 333, a pilot inserter 334, and an OFDM modulator 335. The input processor 331 decomposes data output from the service splitter 320 according to the transmission standard, and generates the transmit packets by inserting a packet header. The encoder and modulator 332 generates the data symbols by channel-encoding and modulating the packets. In so doing, the encoder and modulator 332 encodes and modulates the packets according to the system parameter (e.g., a coding scheme, a coding rate, a modulation scheme, and the like.) of the corresponding zone. The frame builder 333 positions the data symbols based on the frame structure. The frame builder 333 maps the data symbols to the subcarrier and the time resource. The frame builder 333 removes data from the tones to insert the pilot symbols. The pilot inserter 334 inserts the pilot symbols between the data symbols for the data. The pilot symbol insertion pattern; i.e., the pilot pattern, varies according to the corresponding zone. The OFDM modulator 335 applies an Inverse Fast Fourier Transform (IFFT) to a symbol stream including the data symbol and the pilot symbol, and generates OFDM symbols of the corresponding zone by inserting the CP.

In the operations of zone generators 330-1 through 330-N, the frame builder 333 and the pilot inserter 334 determine the pilot pattern of the corresponding zone and then positions the data symbol and the pilot symbol. When the corresponding zone is the criterion zone of the pilot pattern, the frame builder 333 and the pilot inserter 334 utilize a predefined pilot pattern. The pilot pattern includes the subcarrier spacing $D_x$ and the OFDM symbol spacing $D_y$. On the other hand, when the corresponding zone is not the criterion zone of the pilot pattern, the frame builder 333 and the pilot inserter 334 calculate the pilot pattern of the corresponding zone from the criterion zone according to the pilot pattern rule. For example, the pilot pattern rule can be applied by using Equations (2) and (3). Alternatively, the pilot pattern can be predefined in the zone, which is not the criterion zone. Even when the corresponding zone is not the criterion zone of the pilot pattern, the frame builder 333 and the pilot inserter 334 utilize a prestored pilot pattern of the corresponding zone.

The MUX 340 multiplexes the signals of the zones output from the zone generators 330-1 through 330-N. The signals of the zones can be multiplexed using time division or frequency division. The preamble inserter 350 inserts a preamble signal to the front of the frame output from the multiplexer 340. The RF transmitter 360 up-converts the frame signal to an RF signal and then transmits the RF signal via an antenna. For example, the RF transmitter 360 can include an amplifier, a mixer, an oscillator, a Digital to Analog Converter (DAC), and the like.

Figure 4:
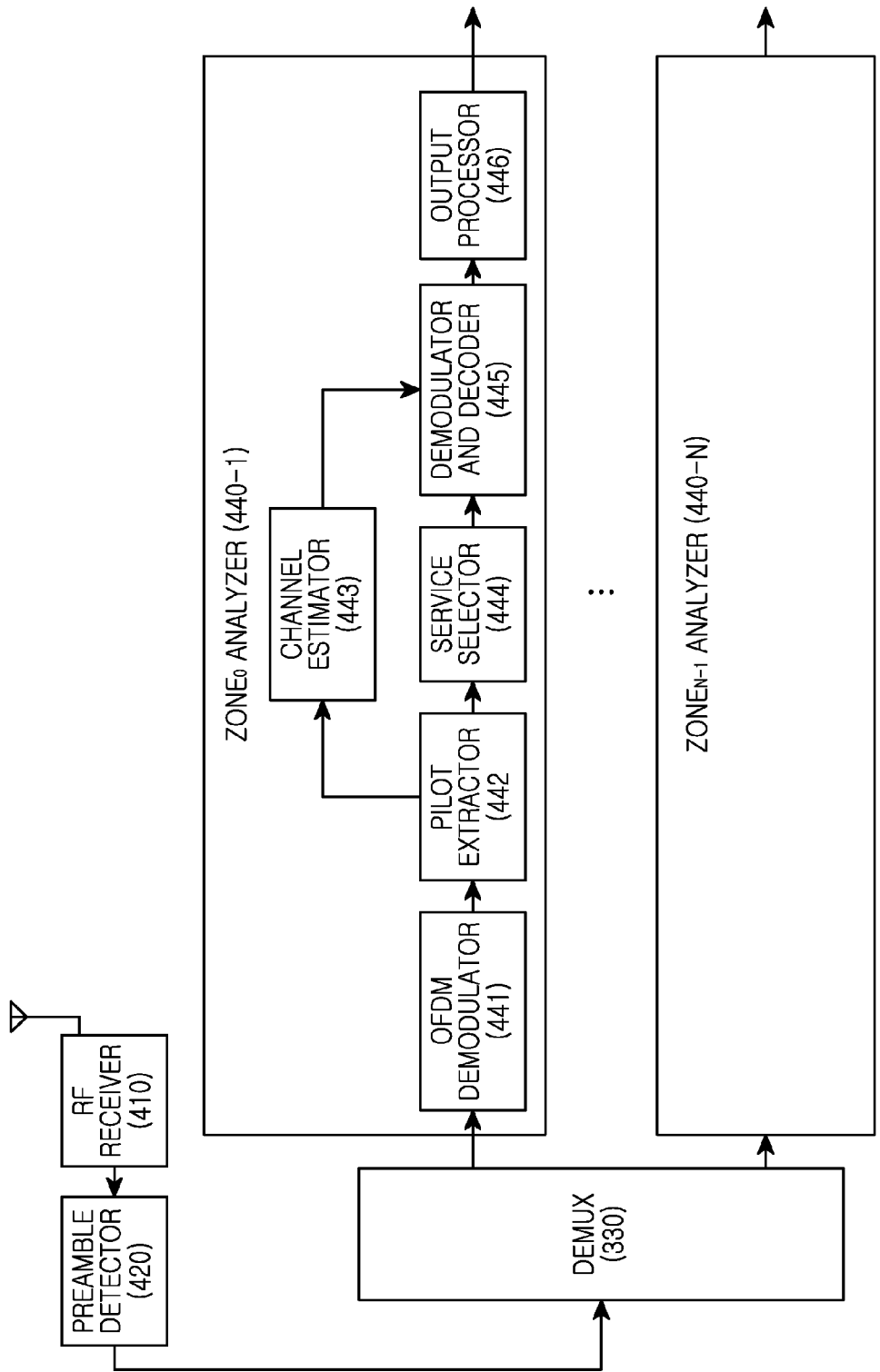
FIG. 4 illustrates a receiving node in the DVB system, according to an embodiment of the present invention.

FIG. 4 is a block diagram of the receiving node in the DVB system according to an embodiment of the present invention.

Referring to FIG. 4, the receiving node includes an RF receiver 410, a preamble detector 420, a DE-MIltipleXer (DEMUX) 430, and a plurality of zone analyzers 440-1 through 440-N.

The RF receiver 410 down-converts an RF signal received via an antenna to a baseband signal. For example, the RF receiver 410 can include an amplifier, a mixer, an oscillator, an ADC, and the like. The preamble detector 420 synchronizes frames by detecting the preamble signal. Since the preamble signal includes a predefined sequence, the preamble detector 420 can detect the preamble signal using correlation. The DEMUX 430 divides the frame into the multiple zones and forwards the divided signals of the zones to the zone analyzers 440-1 through 440-N. As stated earlier in reference to FIGS. 1 and 3, the P2 region and $zone_0$ can be separated in the frame. Besides the N-ary zone analyzers 440-1 through 440-N, a P2 region analyzer (not shown) can be further included. The DEMUX 430 provides the receive signal of the P2 region to the P2 region analyzer.

The zone analyzers 440-1 through 440-M analyze the signals of the zones, and include the same subcomponents. The zone analyzers 440-1 through 440-N apply the different system parameters corresponding to the respective zones. Alternatively, unlike FIG. 4, the receiving node can include a single zone analyzer. The single zone analyzer analyzes the signal by applying the different system parameter according to the zone corresponding to the signal output from the DEMUX 430. That is, using the single zone analyzer, the receiving node analyzes the zone signals consecutively received, according to the system parameters of the zones.

The zone analyzers 440-1 through 440-N each include an OFDM demodulator 441, a pilot extractor 442, a channel estimator 443, a service selector 444, a demodulator and decoder 445, and an output processor 446.

The OFDM demodulator 441 divides the signal of the corresponding zone into the OFDM symbols, and restores the symbols mapped to the frequency domain. That is, the data symbols and the pilot symbols use FFT. The pilot extractor 442 extracts the pilot symbols from the symbols, outputs the pilot symbols to the channel estimator 443, and outputs the data symbols to the service selector 444. The channel estimator 443 determines the channel value of the pilot tone using the pilot symbols and estimates the channel value of the data tones using the channel value of the pilot tone. The service selector 444 extracts the data symbol of the broadcasting service to receive. Signal allocation information of the broadcasting service is obtained from the signaling data in the $zone_0$. The demodulator and decoder 445 compensates for distortion of the data symbol output from the service selector 444 using the channel estimation value provided from the channel estimator 443, and restores the packets including the broadcasting data by demodulating and channel-decoding the data symbol. The output processor 446 recovers the broadcasting data of the packets output from the demodulator and decoder 445 in a form, which can be processed in the upper layer.

In the operations of the zone analyzers 440-1 through 440-N, the pilot extractor 442 determines the pilot pattern of the corresponding zone and then extracts the pilot symbols. When the corresponding zone is the criterion zone of the pilot pattern, the pilot extractor 442 obtains the predefined pilot pattern from the signaling data. The pilot pattern includes the subcarrier spacing $D_x$ and the OFDM symbol spacing $D_y$. On the other hand, when the corresponding zone is not the criterion zone of the pilot pattern, the pilot extractor 442 calculates the pilot pattern of the corresponding zone from the criterion zone according to the pilot pattern rule. For example, the pilot pattern rule can be expressed as Equations (2) and (3). Alternatively, even when the zone is not the criterion zone, the pilot pattern information can be included in the signaling data. Even when the corresponding zone is not the criterion zone of the pilot pattern, the pilot extractor 442 obtains the pilot pattern of the corresponding zone from the signaling data.

Figure 5:
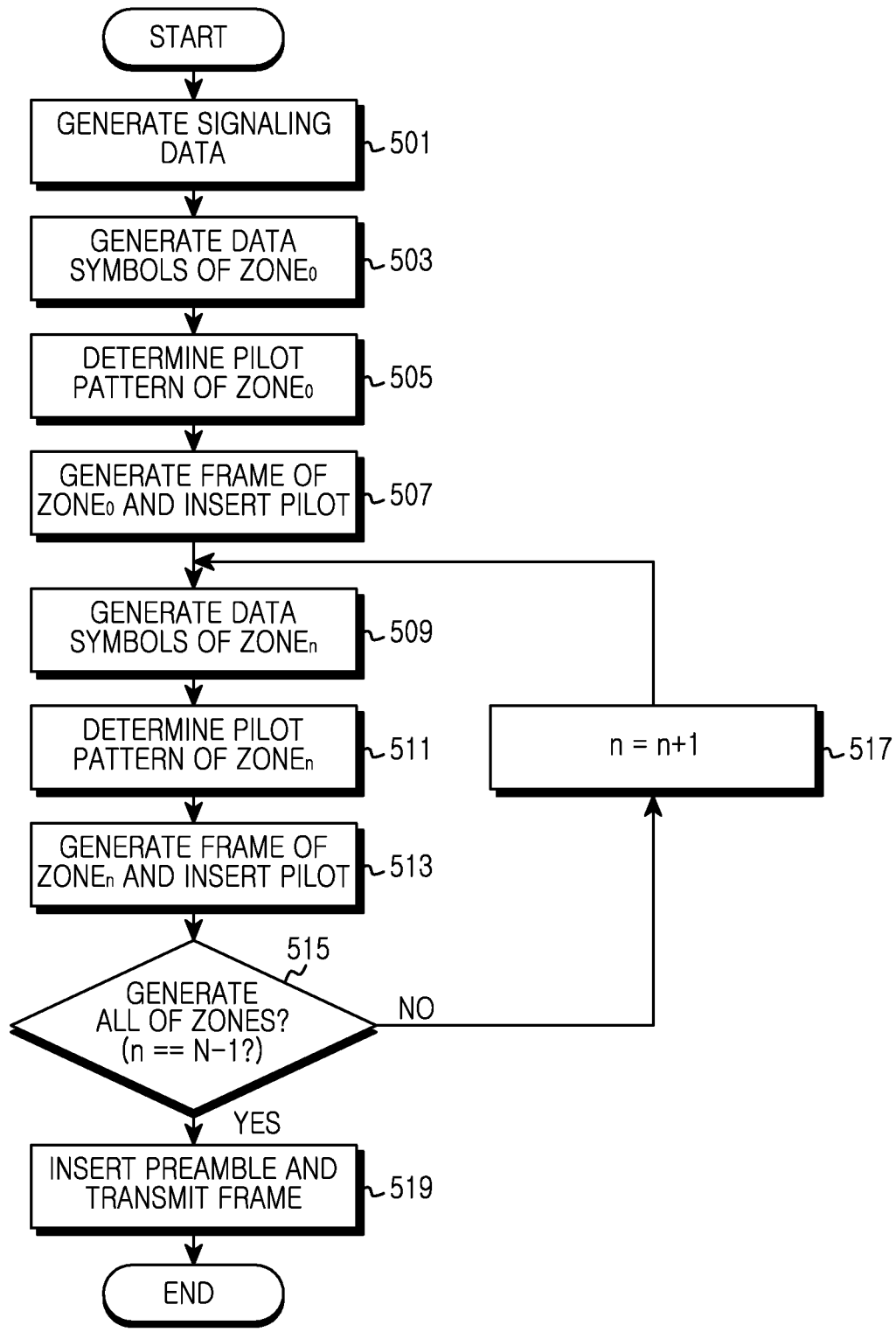
FIG. 5 illustrates operations of the transmitting node in the DVB system, according to an embodiment of the present invention.

FIG. 5 illustrates the steps of the transmitting node in a DVB system according to an embodiment of the present invention.

Referring to FIG. 5, the transmitting node generates the signaling data in step 501. The signaling data includes the system parameter information and the data map of the physical layer zone. For example, the transmitting node generates the physical zone information including characteristic information of the zone (e.g., information relating to the number of the subcarriers, the applied multi-antenna scheme, the guard interval length, and the CP length), and generates the data map including the zone location, the physical layer composition information, the PLP allocation information, and the datastream allocation information depending to the scheduling result. The system parameter information further includes the pilot pattern information of the criterion zone of the pilot pattern. The system parameter information can include the pilot pattern information of a zone than the criterion zone of the pilot pattern.

In step 503, the transmitting node generates the data symbols of the $zone_0$. That is, the transmitting node generates the packets including the data of the broadcasting service in the $zone_0$, and generates the data symbols by channel-encoding and modulating the packets. The transmitting node channel-encodes and modulates the signaling data. In so doing, the transmitting node encodes and modulates according to a system parameter (e.g., the coding scheme, the coding rate, the modulation scheme, and the like) of the $zone_0$.

Alternatively, when the P2 region and $zone_0$ are separated in the frame as shown in FIG. 1, the transmitting node can generate the P2 region data symbols using the signaling data before generating the data symbols of the $zone_0$. The pilot symbol of the P2 region can be positioned in the pilot pattern different from the zone, or the P2 region may not include the pilot.

After generating the data symbols of the $zone_0$, the transmitting node determines the pilot pattern of the $zone_0$ in step 505. The determination of the pilot pattern depends on whether the corresponding $zone_0$ is the criterion zone of the pilot pattern. When the $zone_0$ is the criterion zone of the pilot pattern, the transmitting node uses the predefined pilot pattern. The pilot pattern includes the subcarrier spacing $D_x$ and the OFDM symbol spacing $D_y$. By contrast, when the $zone_0$ is not the criterion zone of the pilot pattern, the transmitting node calculates the pilot pattern of the corresponding zone from the criterion zone according to the pilot pattern rule. For example, the pilot pattern rule may be calculated by Equations (2) and (3). Alternatively, even when the zone is not the criterion zone, the pilot pattern can be predefined. Although the $zone_0$ is not the criterion zone of the pilot pattern, the transmitting node uses the prestored pilot pattern of the corresponding zone.

In step 507, the transmitting node generates the frame of the $zone_0$ and inserts the pilot symbols. That is, the transmitting node maps the data symbols to the subcarrier and the time resource. In so doing, the transmitting node removes data from the tones to insert the pilot symbols. The transmitting node inserts the pilot symbols in the pilot pattern. That is, the transmitting node positions the data symbols and the pilot symbols by applying the pilot pattern.

In step 509, the transmitting node generates a data burst of the $zone_n$. Herein, n is set to 1 when this process initiates, and initialized to 1 when a new frame is generated. That is, the transmitting node generates packets including the data of the broadcasting service in the $zone_n$, and generates the data symbols by channel-encoding and modulating the packets. The transmitting node encodes and modulates according to the system parameter (e.g., the coding scheme, the coding rate, the modulation scheme, and the like) of the $zone_n$.

In step 511, the transmitting node determines the pilot pattern of the $zone_n$. The determination of the pilot pattern is based on whether the corresponding $zone_n$ is the criterion zone of the pilot pattern. When the $zone_n$ is the criterion zone of the pilot pattern, the transmitting node uses the predefined pilot pattern. The pilot pattern includes the subcarrier spacing $D_x$ and the OFDM symbol spacing $D_y$. On the other hand, when the $zone_n$ is not the criterion zone of the pilot pattern, the transmitting node calculates the pilot pattern of the corresponding zone from the criterion zone according to the pilot pattern rule. For example, the pilot pattern rule is calculating using Equations (2) and (3). Alternatively, even when the zone is not the criterion zone, the pilot pattern can be predefined. Although the $zone_n$ is not the criterion zone of the pilot pattern, the transmitting node uses the prestored pilot pattern of the corresponding zone.

In step 513, the transmitting node generates the frame of the $zone_n$ and inserts the pilot symbols. That is, the transmitting node maps the data symbols to the subcarrier and the time resource. In so doing, the transmitting node removes data from the tones to insert the pilot symbols. The transmitting node inserts the pilot symbols in the pilot pattern. That is, the transmitting node positions the data symbols and the pilot symbols by considering the pilot pattern.

In step 515, the transmitting node determines whether all of the zones are generated. That is, the transmitting node determines whether the current n value is N−1 (N denotes the number of the zones). When all of the zones are not completely generated, the transmitting node increments n by one in step 517 and then goes back to step 509 to repeat the loop.

When all of the zones are completely generated, the transmitting node completes the frame generation by inserting the preamble and transmitting the frame in step 519. That is, the transmitting node generates the OFDM symbols of the zones using the IFFT and the CP insertion, inserts the preamble, up-converts it to an RF signal, and transmits the RF signal via the antenna.

Figure 6:
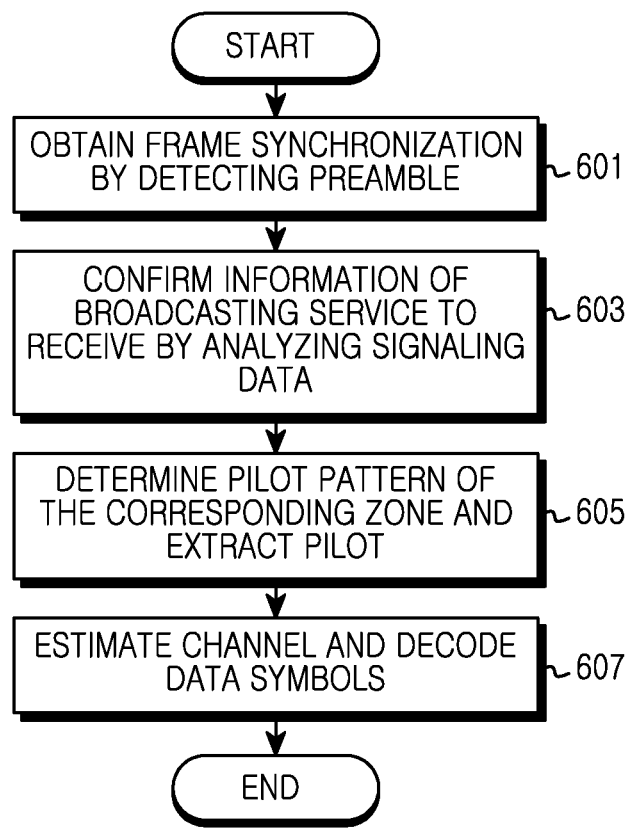
FIG. 6 illustrates operations of the receiving node in the DVB system, according to an embodiment of the present invention.

FIG. 6 illustrates the operations of the receiving node in the DVB system according to an embodiment of the present invention.

Referring to FIG. 6, the receiving node acquires the frame synchronization by detecting the preamble in step 601. Since the preamble signal includes the predefined sequence, the receiving node can detect the preamble using the correlation. The receiving node can obtain the FFT size and the guard interval information of the $zone_0$ from the preamble signal.

Referring back to FIG. 1, the P2 region and the $zone_0$ can be separate in the frame. The receiving node can obtain the FFT size and the guard interval information of the P2 region from the preamble signal, and obtain the physical layer zone information using the signaling information of the P2 region.

In step 603, the receiving node confirms the information from the broadcasting service to receive by analyzing the signaling data. The signaling data includes the system parameter information and the data map of the physical layer zone. For example, the receiving node confirms the characteristic information of the zone in the physical zone information including, for example, confirming the information relating to the number of subcarriers, the applied multi-antenna scheme, the guard interval length, and the CP length, and conforming the zone location, the physical layer constitution information, the PLP allocation information, and the datastream allocation information in the data map. That is, the receiving node confirms the PLP allocation information of the broadcasting service to receive, and the system parameter information of the corresponding zone. The system parameter information further includes the pilot pattern information of the criterion zone of the pilot pattern. The system parameter information can include the pilot pattern information of a zone other than the criterion zone of the pilot pattern.

In step 605, the receiving node determines the pilot pattern of the zone of the broadcasting service to receive, and extracts the pilot symbols. The determination of the pilot pattern is based on whether the corresponding zone is the criterion zone of the pilot pattern. When the corresponding zone is the criterion zone of the pilot pattern, the receiving node confirms the pilot pattern of the corresponding zone in the signaling data. The pilot pattern includes the subcarrier spacing $D_x$ and the OFDM symbol spacing $D_y$. On the other hand, when the corresponding zone is not the criterion zone of the pilot pattern, the receiving node calculates the pilot pattern of the corresponding zone from the pilot pattern of the criterion zone of the signaling data according to the pilot pattern rule. For example, the pilot pattern rule can be calculated by Equations (2) and (3). Alternatively, even when the zone is not the criterion zone, the signaling data can include the pilot pattern. In this case, although the corresponding zone is not the criterion zone of the pilot pattern, the receiving node confirms the pilot pattern of the corresponding zone in the signaling data.

In step 607, the receiving node estimates the channel and decodes the data symbols. Specifically, the receiving node determines the channel value of the pilot tone using the pilot symbols and estimates the channel value of the data tones using the channel value of the pilot tone. The receiving node then compensates for the distortion of the data symbols using the channel estimation value, restores the packets including the broadcasting data by demodulating and channel-decoding the data symbols, and recovers the broadcasting data in the form which can be processed in the upper layer.

As set forth above, in a DVB system adopting the frame structure including the plurality of physical layer zones, a pilot pattern is applied by taking account of the system parameter of the zone. Thus, the zones can provide the same channel estimation performance.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of operation of a transmitting node in an Orthogonal Frequency Division Multiplexing (OFDM) communication system, the method comprising:
generating a frame including a plurality of physical layer zones, each of the plurality of physical layer zones applying different Fast Fourier Transform (FFT) sizes and different pilot patterns; and
transmitting the frame,
wherein the pilot patterns are determined by a physical frequency spacing and a physical time spacing, and
wherein the physical frequency spacing increases and the physical time spacing decreases, when the FFT sizes are increased.

2. The method of claim 1, wherein the pilot patterns provide a same channel estimation performance in each of the physical layer zones.

3. The method of claim 1, wherein the pilot patterns provide a same frequency interpolation performance and a same time interpolation performance in each of the physical layer zones.

4. The method of claim 1, wherein the pilot patterns provide a same time distance between two adjacent pilot symbols in one subcarrier, and provide a same frequency distance between two adjacent pilot symbols in one OFDM symbol.

5. The method of claim 1, wherein the pilot patterns of the physical layer zones are given by the following equation:

$$\frac{D_{x_i} D_{y_i}}{FFT_i} = \frac{D_{x_j} D_{y_j}}{FFT_j}$$

$$D_{y_i} FFT_i = D_{y_j} FFT_j$$

wherein $FFT_i$ and $FFT_j$ denote the FFT size of a zone$_i$ and a zone$_j$, respectively, $D_{x_i}$ and $D_{x_j}$ denote a subcarrier spacing of the zone$_i$ and the zone$_j$, respectively, and $D_{y_i}$ and $D_{y_j}$ denote an OFDM symbol spacing in the zone$_i$ and the zone$_j$, respectively.

6. The method of claim 1, wherein one criterion physical layer zone of the physical layer zones comprises:
signaling data including system parameter information regarding the plurality of the physical layer zones or physical layer zones excluding the criterion physical layer zone.

7. The method of claim 6, wherein the signaling data comprises:
pilot pattern information regarding the plurality of the physical layer zones or the physical layer zones excluding the criterion physical layer zone.

8. A method of operation of a receiving node in an Orthogonal Frequency Division Multiplexing (OFDM) communication system, the method comprising:
analyzing signaling data in a criterion physical layer zone of a plurality of physical layer zones, each of the plurality of physical layer zones applying different Fast Fourier Transform (FFT) sizes and different pilot patterns;
determining a system parameter and a pilot pattern of a zone of a broadcasting service to receive;
extracting pilot tones based on the pilot pattern;
estimating a channel value of data tones using the pilot tones; and
decoding data using the channel value,
wherein the pilot patterns are determined by a physical frequency spacing and a physical time spacing, and
wherein the physical frequency spacing increases and the physical time spacing decreases, when the FFT sizes are increased.

9. The method of claim 8, wherein the pilot patterns provide a same channel estimation performance in the physical layer zones.

10. The method of claim 8, wherein the pilot patterns provide a same frequency interpolation performance and the same time interpolation performance.

11. The method of claim 8, wherein the pilot patterns provide a same time distance between two adjacent pilot symbols in one subcarrier, and provide a same frequency distance between two adjacent pilot symbols in one OFDM symbol.

12. The method of claim 8, wherein the pilot patterns of the physical layer zones are given by the following equation:

$$\frac{D_{x_i} D_{y_i}}{FFT_i} = \frac{D_{x_j} D_{y_j}}{FFT_j}$$

$$D_{y_i} FFT_i = D_{y_j} FFT_j$$

wherein $FFT_i$ and $FFT_j$ denote the FFT size of a $zone_i$ and a $zone_j$, respectively, $D_{x_i}$ and $D_{x_j}$ denote a subcarrier spacing of the $zone_i$ and the $zone_j$, respectively, and $D_{y_i}$ and $D_{y_j}$ denote an OFDM symbol spacing in the $zone_i$ and the $zone_j$, respectively.

13. The method of claim 8, wherein one criterion physical layer zone of the physical layer zones comprises:
    signaling data including system parameter information of the plurality of the physical layer zones or physical layer zones excluding the criterion physical layer zone.

14. The method of claim 13, wherein the signaling data comprises:
    pilot pattern information of the plurality of the physical layer zones or the physical layer zones excluding the criterion physical layer zone.

15. The method of claim 14, wherein determining the pilot pattern comprises:
    confirming pilot pattern information of a zone of a broadcasting service to receive, in the signaling data.

16. The method of claim 8, wherein determining the pilot pattern comprises:
    calculating a pilot pattern of the zone of the broadcasting service to receive, using a pilot pattern of a pilot pattern criterion zone based on a predefined rule.

17. An apparatus of a transmitting node in an Orthogonal Frequency Division Multiplexing (OFDM) communication system, the apparatus comprising:
    a generator for generating a frame including a plurality of physical layer zones, each of the plurality of the physical layer zones applying different Fast Fourier Transform (FFT) sizes and different pilot patterns; and
    a transmitter for transmitting the frame,
    wherein the pilot patterns are determined by a physical frequency spacing and a physical time spacing, and
    wherein the physical frequency spacing increases and the physical time spacing decreases, when the FFT sizes are increased.

18. The apparatus of claim 17, wherein the pilot patterns provide a same channel estimation performance in each of the plurality of physical layer zones.

19. The apparatus of claim 17, wherein the pilot patterns provide a same frequency interpolation performance and the same time interpolation performance in each of the plurality of physical layer zones.

20. The apparatus of claim 17, wherein the pilot patterns provide a same time distance between two adjacent pilot symbols in one subcarrier, and provide a same frequency distance between two adjacent pilot symbols in one OFDM symbol.

21. The apparatus of claim 17, wherein the pilot patterns of the physical layer zones are given by the following equation:

$$\frac{D_{x_i} D_{y_i}}{FFT_i} = \frac{D_{x_j} D_{y_j}}{FFT_j}$$

$$D_{y_i} FFT_i = D_{y_j} FFT_j$$

wherein $FFT_i$ and $FFT_j$ denote the FFT size of a $zone_i$ and a $zone_j$, respectively, $D_{x_i}$ and $D_{x_j}$ denote a subcarrier spacing of the $zone_i$ and the $zone_j$, respectively, and $D_{y_i}$ and $D_{y_j}$ denote an OFDM symbol spacing in the $zone_i$ and the $zone_j$, respectively.

22. The apparatus of claim 17, wherein one criterion physical layer zone of the physical layer zones comprises:
    signaling data including system parameter information of the plurality of the physical layer zones or physical layer zones excluding the criterion physical layer zone.

23. The apparatus of claim 22, wherein the signaling data comprises:
    pilot pattern information of the plurality of the physical layer zones or the physical layer zones excluding the criterion physical layer zone.

24. An apparatus of a receiving node in an Orthogonal Frequency Division Multiplexing (OFDM) communication system, the apparatus comprising:
    a receiver for receiving a signal; and
    an analyzer for analyzing signaling data in a criterion physical layer zone of physical layer zones, each of the plurality of the physical layer zones applying different Fast Fourier Transform (FFT) sizes and different pilot patterns, determining a system parameter and a pilot pattern of a zone of a broadcasting service to receive, extracting pilot tones based on the pilot pattern, estimating a channel value of data tones using the pilot tones, and decoding data using the channel value,
    wherein the pilot patterns are determined by a physical frequency spacing and a physical time spacing, and
    wherein the physical frequency spacing increases and the physical time spacing decreases, when the FFT sizes are increased.

25. The apparatus of claim 24, wherein the pilot patterns provide a same channel estimation performance in the physical layer zones.

26. The apparatus of claim 24, wherein the pilot patterns provide a same frequency interpolation performance and the same time interpolation performance in each of the plurality of physical layer zones.

27. The apparatus of claim 24, wherein the pilot patterns provide a same time distance between two adjacent pilot symbols in one subcarrier, and provide a same frequency distance between two adjacent pilot symbols in one OFDM symbol.

28. The apparatus of claim 24, wherein the pilot patterns of the physical layer zones are given by the following equation:

$$\frac{D_{x_i} D_{y_i}}{FFT_i} = \frac{D_{x_j} D_{y_j}}{FFT_j}$$

$$D_{y_i} FFT_i = D_{y_j} FFT_j$$

wherein $FFT_i$ and $FFT_j$ denote the FFT size of a $zone_i$ and a $zone_j$, respectively, $D_{x_i}$ and $D_{x_j}$ denote a subcarrier spacing of the $zone_i$ and the $zone_j$, respectively, and $D_{y_i}$ and $D_{y_j}$ denote an OFDM symbol spacing in the $zone_i$ and the $zone_j$, respectively.

29. The apparatus of claim 24, wherein one criterion physical layer zone of the physical layer zones comprises:
    signaling data including system parameter information of the plurality of the physical layer zones or physical layer zones excluding the criterion physical layer zone.

30. The apparatus of claim 29, wherein the signaling data comprises:

pilot pattern information of the plurality of the physical layer zones or the physical layer zones excluding the criterion physical layer zone.

31. The apparatus of claim 30, wherein determining the pilot pattern comprises:
confirming, by the analyzer, pilot pattern information of a zone of a broadcasting service to receive in the signaling data.

32. The apparatus of claim 24, wherein determining the pilot pattern comprises:
calculating, by the analyzer, a pilot pattern of the zone of the broadcasting service to receive, and using a pilot pattern of a pilot pattern criterion zone based on a predefined rule.

* * * * *